//www.google.com/

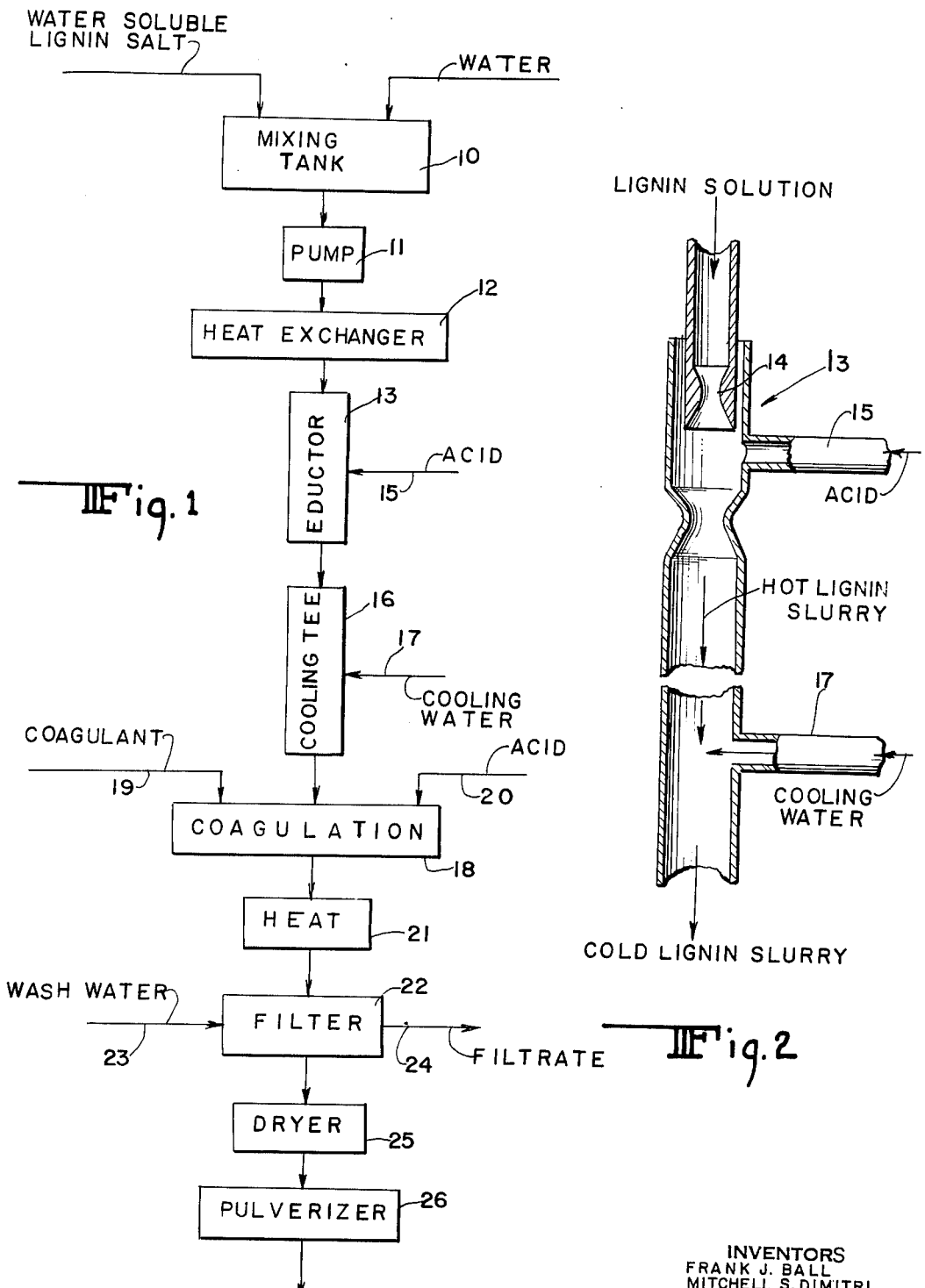

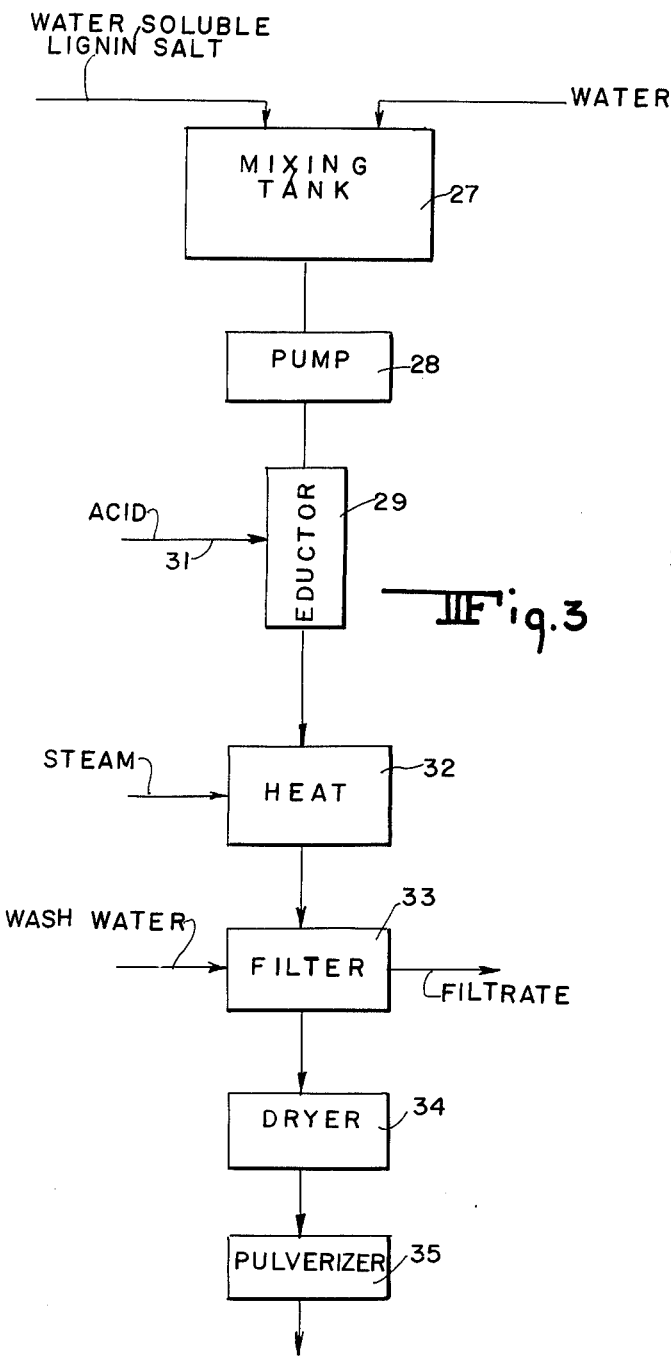
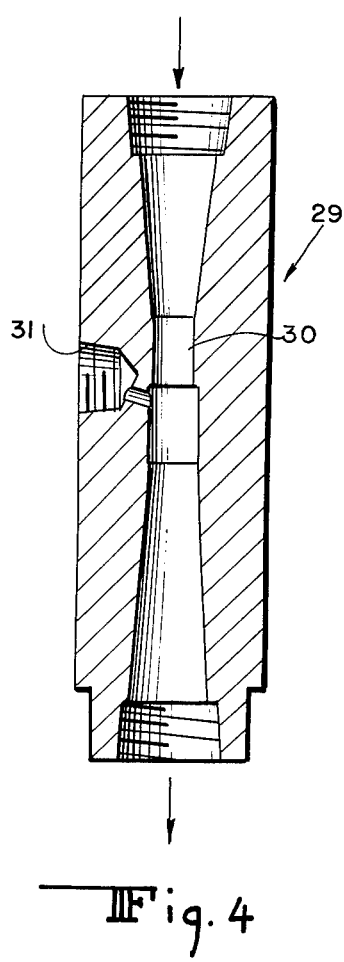

United States Patent Office 3,223,697
Patented Dec. 14, 1965

3,223,697
PRECIPITATED LIGNIN AND PRODUCTS CONTAINING SAME AND THE PRODUCTION THEREOF
Frank J. Ball, 4 Atlantic St.; Mitchell S. Dimitri, 5 Morton Ave., Westwood; and Rudolf Schmut, 35½ Legare St., all of Charleston, S.C.
Filed Aug. 12, 1960, Ser. No. 49,239
11 Claims. (Cl. 260—124)

This invention relates to precipitated lignin and to its production and to products containing such lignin.

In obtaining free cellulose fiber from natural ligno-cellulose material, the ligno-cellulose material ordinarily is subjected to treatment whereby the lignin content is solubilized sufficiently to permit the formation of an aqueous slurry from which the fibers may be separated. The dissolved lignin, which is in the neighborhood of 25% of the natural ligno-cellulose, is contained in the solution from which the fibers are separated.

There are different expedients for solubilizing the naturally occurring ligno-cellulose material so that the free cellulose fiber may be recovered therefrom. This invention is of particular utility in connection with the recovery of "alkali lignin," as this term is used in the art, namely, lignin which is produced as a by-product of alkaline pulping using either the soda process wherein the pulping liquor contains sodium hydroxide of the sulfate process wherein the pulping liquor contains both sodium hydroxide and sodium sulfide. During either of these pulping processes the lignin is dissolved in the pulping liquor, which is usually referred to as "black" liquor, as a salt of lignin and the lignin is conventionally recovered from the pulping liquor by acid precipitation using an acid such as sulfuric or carbonic acid. Depending on the conditions under which the lignin is precipitated, the precipitated lignin may be either in the form of free acid lignin or a lignin salt. If the lignin is precipitated at a high pH such as about 9.5 to 10, the lignin is obtained in the form of a salt, while if the lignin is precipitated at a low pH, such as about 2 to 5, or if lignin precipitate at a high pH is acid washed so as to be substantially free of salt, free acid lignin is obtained. A monovalent salt of lignin such as an alkali metal salt or an ammonium salt of lignin is soluble in water, whereas free acid lignin and polyvalent metal salts of lignin are insoluble in water.

In the recovery of lignin from black liquor the initial product of acid precipitation is separated from residual solution so that the large amount of water contained in the black liquor as initially produced may be removed. The lignin so precipitated ordinarily is put back into solution and reprecipitated with acid so as to separate additional ash-forming ingredients from the lignin precipitate. The lignin precipitate then is concentrated to form a cake containing about 40% to 60% of water which may then be dried for recovery of the lignin in dried form. A drying expedient that is commonly used is that of forming a slurry of suitable consistency to be spray dried, the water content usually being such that the dry lignin constitues about 25% to 40 % by dry weight of the slurry. Conventional spray drying equipment may be employed whereby the lignin slurry is caused to be projected in the form of a multiplicity of droplets into a drying atmosphere. In addition to spray drying, other expedients may be availed of such as drying the lignin as initially produced in the form of a moist cake distributed on either stationary or moving pans or screens.

When lignin is recovered from the black liquor by expedients such as those mentioned hereinabove, the particulate nature of the lignin is essentially that which is formed at the time of its precipitation from solution. Typically, the lignin particles as conventionally precipitated may range from about 1 to 10 microns in diameter, most of the particles being from 2 to 5 microns, although there may be smaller particles of the order of 0.5 micron. The surface area of these lignin particles ranges between approximately 2 to 3 square meters per gram. Since these particles are very difficult to handle in subsequent operations due not only to their relatively small size but also to their gelatinous nature, they are normally coagulated by heating to within a temperature range of 150–205° F. During this coagulation step the particles are fused together to form aggregates which have particle diameters in the range of 10 to 100 microns. These aggregates are essentially particulate entities. When these aggregates are spray dried, some loose agglomeration of the aggregates occurs to produce particles of even larger size. Since the bonds of the agglomerates are very weak they are easily broken down into the aggregates from which they are formed.

While the quantity of lignin produced as a by-product of pulping operations is extremely large, the physical and chemical characteristics of lignin are such that, notwithstanding the vast amount of research that has been carried on over many years, the commercial uses of lignin have heretofore been extremely limited, the bulk of the lignin that is separated from the wood either being used for fuel with incidental recovery of a noncombustible chemical or being sewered.

One of the areas of possible utility for lignin that has been considered is that of the use of lignin as a reinforcing filler for rubber compositions. Some success has been achieved in this field by a process of coprecipitating lignin and latex as shown in U.S. Patent No. 2,608,537. Due to processing difficulties, however, the coprecipitation method has met with very little commercial success. The reinforcing filler most commonly employed in rubber is carbon black which exerts a very strong reinforcing effect, e.g., carbon black when milled into butadiene-styrene rubber will increase the tensile strength from approximately 400 p.s.i. to 2500 to 3500 p.s.i. Conventional lignin when milled in the same manner into butadiene-styrene rubber increases the tensile strength only slightly if at all; the maximum tensile strengths obtainable being approximately 600 p.s.i. The reinforcing effects of carbon black and lignin shown above for butadiene-styrene rubber are very similar to those obtained in other synthetic rubbers such as butadiene-nitrile and chlorobutadiene. In natural rubber which has a non-reinforced tensile strength of approximately 4000 p.s.i., reinforcing agents are employed not to develop strength, as they actually decrease this property, but to increase other properties such as modulus and abrasion resistance. While carbon black decreases the tensile strength of natural rubber only slightly and greatly increases other desirable properties of the natural rubber, conventionally produced lignin greatly decreases the tensile strength, to the range of 2000 to 2500 p.s.i., without greatly increasing other properties appreciably.

The reason for these low strengths has been believed to be due to the large particle size with consequent low surface area of the lignin particles. However, efforts to increase the surface area and decrease the particle size by conventional methods of solids reduction have not achieved the desired results. Apparently grinding or pulverization of the dried particles merely breaks down the fused aggregates into particles roughly equivalent to the original particles obtained during precipitation. Further reduction of the size of the lignin particles appears to be impossible by mechanical means. The result consequently is to cause very little change in either the particle size or surface area of the lignin particles as originally precipitated. Some slight change can be accomplished, however. The average particle diameter may be reduced from the range of 2 to 5 microns to within the range of 1 to 3 microns. The surface area concurrently may increase from the range of 2 to 3 square meters per gram to within the range of 3 to 5 square meters per gram. The results of these changes in the nature of the lignin particles have only slight effect, however, on the strengths of the rubber reinforced with these particles, only increasing the maximum tensile strengths obtainable from about 600 p.s.i. to 800 p.s.i. in butadiene-styrene rubber. This magnitude of strength is, of course, still entirely unsatisfactory.

One of the objects and features of this invention resides in the provision of water insoluble lignin in an improved physical form as compared with conventional precipitated lignin.

Another object and feature of this invention resides in the provision of lignin in a new form whereby enhanced reinforcing properties are afforded, more especially in the case of rubber compositions.

A further object and feature of this invention resides in the provision of improved products comprising precipitated lignin.

A further object and feature of this invention resides in the provision of a method whereby precipitated lignin may be produced having enhanced properties as compared with conventional precipitated lignin.

More particular aspects of this invention relate to the production of precipitated lignin so as to have substantially greater surface area as compared with conventionally produced precipitated lignin and to the improvements thereby obtainable. More particularly, by utilizing the present invention, one is enabled to produce a lignin reinforced rubber composition by the use of dry milling techniques having a tensile strength above 2,000 pounds p.s.i.

It is a feature of this invention that instead of acidifying the lignin solution in the usual way to precipitate lignin from the solution, a stream of the lignin solution is directed through a mixing zone into which another stream of precipitant solution is introduced, and conditions of turbulence are maintained such that the lignin is thrown out of solution in a minutely particulate condition.

Further features of this invention relate to the utilization of heat and changes in temperature whereby conditions are established favorable to disruption of the nascent precipitate into minute particles and whereby, as well, the precipitate may be formed in a condition favorable to filtering and likewise favorable to drying.

According to one way of practicing this invention, a lignin solution is heated to a temperature of at least 180° F. and preferably of the order of 300° to 350° F. prior to entry into the mixing zone. In this way two conditions favorable to obtaining the desired product are obtained. Thus at such elevated temperatures the lignin precipitate is formed at a temperature at which it is somewhat softened, with the result that turbulence maintained in the mixing zone more effecively disrupts the lignin so as to occur in the form of extremely minute particles. Another condition favorable to obtaining the desired product is that at these high temperatures the lignin is caused to occur in the substantially unhydrated condition, which unhydrated condition is largely retained when the solution is ultimately cooled. Particularly if the solution is preheated to a temperature of about 230° F. or higher, the tendency for the tiny softened lignin particles to fuse together again should be counteracted by cooling the suspension virtually immediately after its formation, namely, within about 0.5 second, and preferably within about 0.25 second, following the admixture of the precipitant.

An alternative and in certain respects the preferred way of practicing the method of this invention resides in causing the stream of lignin solution while at a relatively low temperature such as about 80° F. to be propelled through the mixing zone wherein it is subjected to intense agitation while the precipitant is being commingled therewith. In such case the lignin precipitate is initially formed in a hydrated and, therefore, in a relatively soft, gelatinous condition favorable to being disrupted into minute particles by the turbulence maintained in the mixing zone and the water of hydration contained in the minute lignin particles may in large measure be eliminated by subsequently heating the resulting suspension to a temperature above about 180° and preferably below about 210° F. While temperatures above 210° F. can be employed, it is important that the lignin be subjected to these temperatures for very short periods of time to prevent fusion due to softening of the lignin particles.

In either way of practicing this invention, it is desirable from the standpoint of producing a lignin which is effective as a reinforcing agent for rubber that the lignin particles while still in the aqueous suspension be subjected to temperatures above 180° F. While the reasons for this are not thoroughly understood, the ability of the lignin to reinforce rubber after undergoing this heating step is vastly greater than lignins produced without heating.

Further objects, features and advantages of this invention are disclosed and illustrated hereinbelow in connection with certain examples of the practice thereof, these examples including reference to the accompanying drawings, wherein:

FIG. 1 is a flow diagram of the method steps utilized according to one way of practicing this invention wherein the lignin solution is directed in a preheated condition through the mixing zone;

FIG. 2 is an enlarged diagrammatic view showing in section one type of eductor which may be used for effecting turbulence in the mixing zone into which the precipitating liquid is introduced, followed by the admission of a cooling liquid;

FIG. 3 is a flow diagram showing the step sequence according to that method of practicing this invention wherein the solution is heated after having passed through the mixing zone; and FIG. 4 is an enlarged sectional view illustrating an alternative type of eductor which may be used.

EXAMPLE I

Referring to FIGS. 1 and 2, a 10% solution of sodium lignate was prepared in the mixing tank 10 by dissolved dry sodium lignate in sufficient water to produce the 10% solution. The resulting solution was pumped by the pump 11 through the heat exchanger 12 wherein the solution was heated to substantially 345° F. The hot solution was fed at the rate of 6 gallons per minute and at a pressure of about 250 p.s.i. through the eductor 13 shown on a larger scale in FIG. 2, the eductor having a cross-sectional flow capacity at the throat 14 of ⅛″ diameter and the pressure drop being about 190 p.s.i. 60° Bé. sulfuric acid (78%) was continuously fed into the eductor through the acid line 15 at the rate of 0.03 gallon per minute and at a temperature of 52° F. This reduced the pH of the solution to a pH of substantially 6.4 and reduced the temperature to 312° F.

Cooling water at 70° F. was then added at the cooling T 16 through the cooling water line 17 at the rate of approximately 9 gallons per minute. This resulted in an almost instantaneous drop in temperature to 164° F., the calculated average residence time between the addition of the acid and the addition of the cooling water being 0.24 second. Under these conditions of intense turbulence produced in the eductor the acid precipitant becomes commingled with the lignin solution substantially instantaneously and the turbulence subjects the lignin particles to a shearing action at the moment of their initial production, the disruption of the lignin particles as they are formed being favored by the relatively high temperature of the lignin solution at which the precipitated lignin as formed is soft and adhesive. The aggregation of the particles into fused particles is minimized by the immediate cooling of the solution to a temperature at which the particles become sufficiently non-adhesive so as to remain in the form of discrete, very minute particles.

Instead of using a cooling T, the cooling water has been introduced through a second eductor. However, the use of a simple cooling T has ben found to be effective.

In order to aid in the filtration of these very fine particles, a small amount of latex equal to about 5% by weight of the lignin was coagulated on the lignin particles in the coagulation zone 18 to which the latex may be added by the line 19, the acid used to coagulate the latex being added by the line 20, to form loosely bound agglomerates. The filterable lignin agglomerates were washed while on the filter 22 with wash water introduced by the line 23, the residual suspending liquid and wash water being removed through the filtrate line 24. According to this example, the washing was continued to a pH of 4. The recovered lignin, which contained about 50% to 60% by weight of occluded water then was dried at drier 25 at about 180° to 200° F. using a forced convection oven. During drying the lignin formed a crusty cake. This cake was pulverized using the pulverizer 26, to obtain a very fine free flowing powder.

The powdered precipitated lignin produced as above described was composed of extremely small particles. When examined using an electron microscope, most of the particles appeared to be of the order of 0.1 micron or less, the largest particles being about 0.2 to 0.3 micron. These dimensions apply to what appear under the microscope to be the particulate entities as distinguished from groupings of the particles into irregularly shaped loose agglomerates. The surface area of the lignin powder was about 28 square meters per gram. The surface area of the particles was determined by employing the Brunauer-Emmet-Teller method using nitrogen adsorption and whenever "surface area" is referred to herein or in the claims, it is the surface area as determined by this method.

The precipitated lignin powder produced and having the physical characteristics aforesaid was dry milled with a butadiene styrene rubber in the production of an otherwise conventional rubber composition, the amount of lignin loading being 50% of the weight of the rubber. The following are the ingredients of the rubber composition which was prepared:

| | G. |
|---|---|
| Butadiene styrene rubber type #1502 | 200 |
| Precipitated lignin | 100 |
| Stearic acid | 2 |
| Phenyl betanaphthylamine antioxidant | 2 |
| Aromatic petroleum derivative plasticizer | 10 |
| Zinc oxide | 10 |
| Benzothiozyl disulfide, primary accelerator | 3 |
| Copper dimethyl dithiocarbamate, secondary accelerator | 4 |
| Sulfur | 10 |

The rubber composition was prepared on a roll mill while maintaining the temperature substantially at 60° C. After the uncured dried rubber had been broken down for about 10 minutes the precipitated lignin powder was added slowly to the rubber over a period of about 10 minutes, the lignin powder being sprinkled onto the rubber adjacent the roll nip. The rubber was milled for about 10 minutes after the addition of the lignin powder had been completed. The stearic acid and anti-oxidant then were added and milled in for about 3 minutes. The plasticizer was then added and milled in for about 3½ minutes. The zinc oxide, the primary accelerator and the secondary accelerator were added next and milled in for about 3 minutes. Lastly, the sulfur was added and milled in for about 5 minutes. The rubber was then sheeted out from the roll mill at a thickness of approximately 0.075 inch. The sheeted rubber was cured in a mold at about 290° F. for curing times of 15, 30 and 45 minutes. The cured rubber composition was found to possess the properties set forth in Table 1, as follows:

*Table 1*

| Cure Time, min. | Tensile Strength, p.s.i. | Elongation, Percent | Tear Resist., p.s.i. | Modulus 300% p.s.i. |
|---|---|---|---|---|
| 15 | 2,160 | 847 | 213 | 368 |
| 30 | 2,217 | 785 | 177 | 435 |

Standard ASTM tests D412-51T and D-624 were used to determine the properties of the rubber shown above and elsewhere herein.

The tensile strength values set forth in the foregoing table exceed 2000 p.s.i. By contrast, when powdered lignin prepared by conventional precipitation methods was employed in an otherwise similar rubber composition the tensile strength was much lower, namely, of the order of 300 to 600 p.s.i.

Factors which may be controlled by the operator for the attainment of lignin particles having desirable properties as a rubber reinforcing agent utilizing the procedure shown in Example I will now be briefly described.

Generally speaking, the properties of the precipitate are improved by increasing the intensity of the turbulence produced by the agitation which is effected immediately upon causing the lignin to become precipitated. The use of an eductor for effecting hydraulically induced turbulence has been found to be satisfactory. Under the conditions of the foregoing example, the Reynolds number was of the order of 140,000. It is desirable in the practice of this invention that the turbulence which is induced by an eductor or otherwise correspond to a Reynolds number of at least 75,000. The Reynolds number referred to is determined by one formula:

$$N_{Re} = \frac{4w}{\pi D \mu}$$

where:

$N_{Re}$=Reynolds number weight rate of flow
$w$=lbs. mass/sec.
$D$=Diameter in feet
$\mu$=Viscosity of fluid in lbs. mass/(ft.) (sec.)

The concentration of the lignin solution does not appear to be of great significance and satisfactory results have been obtained using concentrations which vary from about 2.5% to 20%, although a higher degree of turbulence will be required at higher concentrations to produce particles equivalent to those which can be produced at lower concentrations using lower turbulence.

In carrying out the method of Example I, properties favorable for effecting reinforcement of rubber compositions were promoted by using relatively high temperatures of around 300° to 350° F. However, lower temperatures may be used down to about 180° to 200° F. when the dehydrating effect of such temperatures is introduced into the system by the heat supplied to the lignin solution prior to precipitation of lignin therefrom.

Another factor which promotes the production of precipitated lignin having enhanced reinforcing characteristics is that of cutting down the residence time prior to quenching to the lowest minimum that is feasible. This residence time from the moment of introduction of the acid to the moment of introduction of the cooling liquid, as measured by the rate of flow from the one point to the other, has been reduced to as little as 0.12 second with beneficial results.

The provision of immediate quenching is especially important at preferred initial solution temperatures of the order of 300° to 350° F. and, more generally, at a temperature above about 230° F., at which the temperature is sufficiently high to substantially soften the lignin precipitate that is formed; and the use of these temperatures followed by an immediate quench to a temperature of about 180° F. or lower constitutes preferred practice of this invention. However, the dehydrating effect on the precipitated lignin may be obtained at lower temperatures of the order of 180° F. to 230° F. and in such case there is less tendency for the precipitated lignin to agglomerate into large masses and the chilling or quenching with cooling water may be dispensed with and still obtain much improved reinforcing properties as compared with those of conventional precipitated lignin. Moreover, less effective chilling steps may be resorted to. Thus even when the solution is heated to a temperature of over 300° F., such chilling as may be effected by flashing the hot solution into the atmosphere enables the lignin to be formed so as to provide much improved reinforcing properties as compared with conventional precipitated lignin.

When the lignin is precipitated by means of an acid, it has been found that the reinforcing properties are especially high when the precipitation is caused to occur at a pH ranging from about 5 to about 7 or slightly greater subject to the lignin being sufficiently insoluble in water to precipitate out. Preferably the pH is of the order of 6 to 6.5. The concentration of the added acid does not appear to have very much effect, but in the case of sulfuric acid the use of 78% acid is preferable for economic reasons.

EXAMPLE II

In the practice of the method of Example II the lignin particles are precipitated at relatively low temperatures as compared with those employed according to Example I and the hydration of the lignin precipitate that occurs when the precipitation is caused to take place at these lower temperatures results in the formation of the precipitate in a gelatinous condition favorable for disruption under the shearing action of the intense turbulence to form minute lignin particles. The dehydration of the particles thereafter may be accomplished by a subsequent heating step which likewise promotes controlled agglomeration of the particles so that they may be filtered out while at the same time the particles do not become fused or coalesced so as to prevent their being reduced to their ultimate particulate nature during milling into a rubber composition. The method of Example II has the merit of enabling precipitated lignin having desired physical characteristics to be produced without the employment of the combined high temperatures and pressures utilized according to the method of Example I. Accordingly, there are economies as regards both plant equipment and power requirements. Example II will now be described in connection with FIGS. 3 and 4.

A 10% solution of sodium lignate was prepared in the mixing tank 27 at a temperature of substantially 80° F. The solution was pumped by the pump 28 at the rate of 10 gallons per minute and at a pressure of 300 p.s.i. through the eductor 29, whose diameter at the throat 30 is about 3/16 inch. A stream of 60° Bé. sulfuric acid (78%) was introduced by the acid line 31 into the stream of lignin solution passing through the eductor at the rate of 0.07 gallon per minute, with resultant lowering of the pH to a pH of 3.2. In passing through the eductor to substantial atmospheric pressure there was a pressure drop of 210 p.s.i. The suspension of the precipitate then was heated in heating zone 32 by direct contact with introduced steam to a temperature between 190° and 200° F. to effect dehydration of the lignin precipitate and also to promote controlled coagulation of the precipitated lignin particles for better filtration. The particles were then washed and filtered on the filter 33, as described in Example I, and thereafter were dried in the drier 34 and the dried cake subjected to pulverization by the pulverizer 35, as likewise described hereinabove in connection with Example I.

The resulting lignin particles produced according to the method of Example II were, for the most part, less than 0.1 micron in size, substantially all of the particles being less than 0.3 micron. The surface area of the precipitated lignin powder was about 32 square meters per gram.

The precipitated lignin produced as disclosed in Example II was then dry milled into rubber as described in Example I, and the resulting properties of the cured rubber are set forth below in Table 2.

TABLE II

| Cure Time, min. | Tensile Strength, p.s.i. | Elongation, Percent | Tear Resist., p.s.i. | Modulus 300% p.s.i. |
|---|---|---|---|---|
| 15 | 2,465 | 870 | 215 | 440 |
| 30 | 2,030 | 760 | 150 | 515 |
| 45 | 1,895 | 700 | 120 | 620 |

In carrying out the method of Example II, the factors which may be controlled so as to favor desired reinforcing properties will now be described.

The intensity of the agitation and resulting turbulence follows generally the same pattern as that described hereinabove in connection with Example I.

In carrying out the method of Example II it normally is desirable to effect the precipitation at substantially atmospheric temperature. This not only is desirable from the point of view of obviating a heating step at this stage, but also from the point of view of the reinforcing characteristics of the precipitate that is produced. When precipitation is effected at temperatures of the order of 35° to 120° F. the conditions are favorable to the production of a precipitate having a greater surface area than when higher temperatures are employed due, it is believed, to the fact that the hydrated gelatinous nature of the lignin particles produced within this temperature range is favorable to the precipitated particles being ruptured into minute, irregularly shaped particles without the particles being of a sufficiently softened nature to permit fusion. The precipitating temperature preferably is between about 70° F. and 100° F. If the method of Example II is carried out at higher temperatures, even up to temperatures above 190° F., in which case no subsequent heating step is necessary, the characteristics of the precipitate for reinforcing purposes in rubber compositions are less desirable, but even under these conditions the reinforcing properties are substantially improved as compared with conventionally precipitated lignin.

In carrying out the method of Example II, the most favorable pH range appears to be from about 3 to about 4.3, preferably, approximately 3.5.

While the method of practicing this invention as illustrated in Examples I and II utilize what may appear to be quite different processing conditions, Examples I and II have features in common as regards the action which takes place and the results obtained. In each case a lignin solution is precipitated in a zone of high turbulence, and in each case the lignin particles as they are precipitated are in a softened condition when subjected to the action of fluid shear imparted by the turbulence whereby they are more effectively reduced to extremely small particle size. Moreover, in each case the particles are hardened responsive to changing the temperature of the aqueous medium in which they are suspended. In the case of Example I, the softened condition of the lignin is effected by the high temperature to which the lignin is subjected and hardening of the minute particles is effected by thereupon cooling the suspensions so as to prevent excessive coalescence of the softened particles and so that, to the extent that the particles become formed into agglomerates, they form loose agglomerates which may be readily broken up. In the case of Example II, the softening of the lignin is caused by the hydration of the particles that occurs at the temperature employed and hardening of the particles is effected by heating the suspension to a high temperature at which dehydration of the particles occurs.

Both the methods likewise are similar in the necessity, at least for the production of high quality reinforcing agents for rubber, for heating the lignin particles while still in suspension in the fluid medium to a temperature above 180° F. In the mehod of Example I, this heating above 180° F. is accomplished at the time of precipitation. By this method the heating to cause dehydration can be accomplished very quickly and rapidly since very high temperatures, up to about 350–400° F., can be employed and cooling can be accomplished almost instantaneously. According to the method of Example II, the heating is accomplished in a separate step, the temperatures employed being much lower on the order of 180–210° F. Higher temperatures cannot readily be employed when utilizing the method steps of Example II due to the difficulties encountered in carrying out the heating and cooling steps sufficiently rapidly so that fusion of the particles does not occur after dehydration has taken place. The process of Example II offers an advantage, however, in that the mild heating not only dehydrates the lignin particles but also causes loose agglomeration of the lignin particles to yield a much more easily filterable mass. In the case of Example I, a reheating step to within the range of 180–210° F. can be used to cause this loose agglomeration of the particles. These agglomerates of particles while being strong enough to withstand the mild shearing action which occurs during filtering and washing are easily broken down into the ultimate minute particles of lignin either by pulverizing or during milling into the rubber. These agglomerates should not be confused with the aggregates formed upon the fusion of lignin particles together, such as are produced in the normal manner of coagulating lignin. In such processes as shown in U.S. Patents 2,464,828 and 2,623,040 for coagulation of lignin, aggregates are formed which are very difficultly broken down by pulverization or dry milling into the rubber and tightly bound aggregates also are normally produced when lignin is precipitated under conditions of slight turbulence. The particles produced by this invention cannot be seen, either by the naked eye or through optical microscopes and it is necessary to employ an electron microscope to photograph the individual particles. These particles have diameters which are of the order of 1/10 or less of the diameters of the particles as precipitated under conditions of only slight turbulence.

Unfortunately, in producing dispersion of the very fine particles produced by this invention for viewing under an electron microscope, some modification of the particles takes place. Consequently, it is very difficult to accurately determine the particle size of the lignin. It appears however that there is a very good correlation between the apparent particle size of the lignin produced and the strength properties of rubber into which it is milled. Due to the difficulties of measuring the particle size, another method for testing lignin was resorted to. This consisted of surface area measurement which is an indirect function of the particle diameter, i.e., a decrease in the diameter of a particle results in an increase in the surface area. The surface area is very easily measured and also correlates quite well with the reinforcing properties imparted by the lignin. In the practice of this invention for the purpose of producing rubber reinforcing grades of lignin, a surface area of at least 20 square meters per gram should be developed. This is approximately equal to 2.2 acres per pound. Preferably, a surface area of at least 30 square meters per gram should be developed and most desirably, surface areas above 40 square meters per gram. Lignins having a surface area of 20 square meters per gram have been found to yield butadiene-styrene reinforced rubbers having tensile strengths of 1600 p.s.i. Increasing the surface areas to 30 square meters per gram will increase the tensile strength of the butadiene-styrene rubber to about 2100 p.s.i., and a further increase in the surface area to approximately 40 square meters per gram will yield butadiene-styrene rubbers having tensile strengths of around 2600 p.s.i. For other synthetic rubbers, these strengths will vary only slightly. In the case of natural rubber the strength will be vastly higher due to the characteristics of natural rubber and will be well over 3000 p.s.i.

In the practice of this invention by either of the methods illustrated in Examples I and II, it is often preferable to employ a small amount of a coagulant as a filter aid in order that the residual liquid may more readily be separated from the precipitated particles which, as initially formed under the conditions of intense turbulence, are extremely minute. When latex is used as in the foregoing examples, it ordinarily constitutes from about 1% about 10% by dry weight of lignin. In addition to latex, there are a number of other well known coagulants which serve a similar purpose. Thus another coagulant which has been used is that which is sold under the trade name "Polyox," which is a very high molecular weight water-soluble glycol. When this type of coagulant is employed, it is not necessary to employ an acid to cause coagulation. Moreover, the precipitated lignin is formed in a somewhat finer particle size. Examples of other known coagulants are Separan 2610 and Superfloc 16.

The small particle size lignin produced by this invention may be used for reinforcing rubber by other means than by dry milling. The lignin may be incorporated into the rubber by the so-called master-batch process in which the latex is added to the lignin particles while still in the slurry and the latex coagulated on the lignin particles. The strengths obtained by the use of such methods are roughly equivalent to those obtained by filtering the lignin particles and drying to obtain a powder and then milling the dry powder into the rubber. This process has a definite advantage of eliminating the step of filtering and drying the very fine lignin particles by themselves. The master-batching of the minute particles of lignin is to be contrasted with the coprecipitation of lignin and rubber in which the lignin is precipitated at the time of coagulation of the rubber. In the master-batch the lignin has already been precipitated in particulate form and the latex is merely coagulated on these particles.

When a coagulant is employed, its introduction may be effected at any convenient stage so that its presence may be utilized as a filter aid. Thus the coagulant may be passed through the mixing zone or introduced with the cooling water when the method of Example I is employed.

Since strongly acid substances interfere with the curing of rubber, it is desirable where the lignin is to be used as a reinforcing agent that it be washed to a pH of at least 4.

In separating the precipitated lignin from the residual liquid, such separation may be accomplished in any suitable way. Thus instead of using a filter, one may employ a centrifugal separator.

Any precipitating agent may be employed in the practice of this invention that may be introduced as an aqueous solution into the aqueous lignin solution. Strong mineral acids other than sulfuric acid may be employed such as hydrochloric or nitric acids. Organic acids also may be employed such as acetic, formic or acrylic acid. The function of the acid is that of reducing the pH of the lignin solution to a pH at which the lignin precipitates out and for this reason the choice of the acid employed is largely dictated by considerations of economy. The polyvalent metal salts of lignin are water-insoluble and any aqueous solution of a polyvalent metal salt may be employed. For example, suitable salts which may be used in aqueous solutions are aluminum sulfate, zinc chloride, magnesium sulfate, lead acetate, and barium acetate.

In ordinary practice of this invention the lignin solution from which the lignin is precipitated is an aqueous solution of the sodium salt of lignin. However, any other water-soluble salt of lignin may be employed, namely, the lignin salts of any of the alkali metals or the ammonium salt of lignin. The method can also be carried out using the original black liquor. The term "lignin" as used herein has reference to alkali lignin and to modified forms thereof such as those mentioned hereinbelow or other recovered lignin having equivalent properties and characteristics.

When utilizing the lignin precipitated as herein described as a reinforcing filler for rubber, natural rubber may be used or any of the conventional synthetic rubbers such as butadiene-styrene, butadiene acrylonitrile, butyl, and urethane rubbers, as well as modified rubber material such as chlorobutadiene. Moreover, compounding materials and steps other than those exemplified hereinabove may be employed.

The amount of lignin precipitated according to this invention which may be employed as a reinforcing filler for rubber may range from about 15 to 150 parts per 100 parts of rubber, although the preferred range is of the order of about 40 to 100 parts of the specially precipitated lignin per 100 parts of rubber. Particularly desirable reinforcement has been obtained using approximately 70 parts of the specially precipitated lignin per 100 parts of rubber. When thus used as a reinforcement, the lignin is ordinarily employed as the sole reinforcing filler. However, mixture of the specially precipitated lignin and other reinforcing fillers such as carbon black may, if desired, be employed.

The very fine particles of lignin produced according to this invention have been found to be very effective as an antiozonant and antioxidant in the rubber. When employed in such a capacity, very minute quantities of the lignin on the order of 0.5 to 2%, is desirably employed.

According to the foregoing examples, the turbulence is provided by pumping the lignin through the eductor. While the use of an eductor normally is preferable, it is not without the scope of this invention to provide turbulence by other expedients. Thus the lignin solution could be directed through a mixing zone containing a high speed mechanical agitator, the cross-sectional flow capacity of the zone being such that the added precipitant solution becomes dispersed substantially instantaneously with the lignin solution and becomes subjected to the shearing action of the turbulence while in a nascent and, preferably, while in a somewhat softened condition. Turbulence providing the desired shearing action likewise may be provided by a vibratory agitator such as an ultrasonic vibrator.

While this invention ordinarily is practiced using alkali lignin as it normally occurs and is recoverable from black liquor, nevertheless the lignin may be modified so long as the lignin is soluble and is susceptible to precipitation under the conditions herein described. Thus the lignin may have been subjected to oxidation as by passage of air through the lignin solution so that the lignin becomes precipitated in oxidized condition. Similarly, the lignin may be chemically modified in other respects and, as mentioned hereinabove in connection with the employment of coagulants, a small amount of an additive material may be carried down as a part of the lignin precipitate. Materials other than coagulants may thus be carried down with the precipitate. However, in any case, the basic precipitate is the precipitated lignin and this term has reference to the lignin as such as well as to the lignin which may be modified chemically or by the fact that some other substance is carried down with the precipitate. The use of modified lignins will result in changes in the degree of heating which the particles should be subjected to while in the fluid suspension. Thus when an oxidized lignin is employed, temperatures above about 220° to 230° F. should be used, although these temperatures may vary somewhat with the degree of oxidation. Likewise when polyvalent metal salts are used to precipitate the lignin, higher degrees of heating will be necessary. Most of the lignin salts will require heating above 250° F. to achieve desired results. The use of hardwood lignins, however, which have a lower melting temperature, will generally require the use of lower temperatures in the range of 170–190° F.

When reference is made to the precipitate being in discrete powder form, the reference is to the particles being disposed in a mass of essentially separate particles or minute agglomerates thereof, as distinguished from their occurrence dispersed in a binder forming a coherent matrix, e.g., rubber. While the powder product may be dry, the particles of the powder may occur in discrete powder form when moist or even when suspended in an aqueous medium.

While specific mention has been made of the employment of lignin which has been precipitated according to this invention as a reinforcing filler for rubber compositions, its use as a reinforcing filler is not limited to such compositions and the precipitated lignin of this invention may be used wherever an extremely minute organic particulate filler may be desired, such as in plastics such as polyethylene. Moreover, the specially precipitated lignin of this invention has other areas of utility such as its use as a carrier for insecticides, fungicides and the like. When the lignin has been specially precipitated according to this invention, the particles are substantially smaller than the particles of conventionally produced lignin and likewise appear to possess greater size uniformity. Thus conventionally produced powdered lignin, while comprising as the bulk of the particles substantially larger than the particles of lignin produced according to this invention, also comprises a certain amount of material which is extremely dusty and extremely slow settling when suspended in air. The specially precipitated lignin of this invention, while made up of extremely minute particles, is not an extremely dusty product. Accordingly, for usage such as a dusting powder, the advantages of extremely small particle size are obtained while at the same time wastage in the form of substantially non-settling air-borne dust is not increased, and in fact may be reduced.

Lignin particles for use as carrier dusts for insecticides or fungicides need not be as small as lignin particles utilized in reinforcing of rubber and particles possessing surface areas as low as 10 square meters per gram may satisfactorily be employed in such a use although higher surface areas are generally to be preferred.

What is claimed is:
1. Alkali lignin in discrete powder form having a surface area of at least 20 square meters per gram.
2. The lignin of claim 1 having a surface area of at least 30 square meters per gram.
3. The lignin of claim 1 having a surface area of at least 40 square meters per gram.
4. A method of producing precipitated lignin which comprises continuously propelling, at a temperature between 35 and 190° F., a stream of an aqueous solution of alkali lignin through a mixing zone of constricted cross-sectional area with sufficient velocity to create conditions of turbulent flow in excess of a Reynolds number of 75,000 in said mixing zone, continuously introducing a stream of an aqueous solution of a precipitant for said lignin selected from the group consisting of acids and polyvalent metallic salts, whereby said precipitant solution is mixed substantially instantaneously with said lignin solution and the lignin is precipitated in said mixing zone and subjected to said conditions of turbulent flow, and recovering the precipitated lignin by separating the residual liquid therefrom.
5. A method of producing precipitated lignin which comprises continuously directing an aqueous solution of alkali lignin at a temperature between about 35 and 100° F. through a mixing zone of restricted cross sectional area with sufficient velocity to create turbulent flow conditions of a Reynolds number in excess of 75,000 in said mixing zone, continuously introducing an acid precipitant solution into said mixing zone whereby said lignin and precipitant solutions are mixed and the lignin precipitated in said mixing zone to form an aqueous suspension of lignin particles, thereafter heating said aqueous suspension of lignin particles to a temperature between 180 and 210° F. and recovering the precipitated lignin from the suspending lignin.

6. A method of producing precipitated lignin which comprises heating an aqueous solution of alkali lignin to a temperature of at least 180° F., continuously directing said solution while at said temperature through a mixing zone of constricted cross sectional area with sufficient velocity to create conditions of turbulent flow in excess of a Reynolds number of 75,000 in said mixing zone, continuously introducing a solution of an acid precipitant into said mixing zone whereby said precipitant solution is mixed with said lignin solution causing precipitation of the lignin in said mixing zone thus forming an aqueous suspension of lignin particles, directing a continuous flow of said suspension of lignin particles to a cooling zone, continuously introducing a cooling liquid into said cooling zone to cool said suspension of lignin particles to a temperature below 180° F. in not more than 0.5 second from the time said lignin and precipitant solutions are mixed in said mixing zone, and thereafter recovering the precipitated lignin from the residual solution.

7. The method of claim 6 wherein said lignin solution is heated to a temperature between 300 and 350° F. and the cooling of the suspension of lignin particles is conducted within 0.25 second of the time said lignin and precipitant solutions are mixed.

8. A method of producing precipitated lignin which comprises the steps of directing a stream of an aqueous solution of alkali lignin through a mixing zone with the temperature of said lignin solution being between 35 and 190° F., introducing into said mixing zone an aqueous solution of a precipitant for said lignin selected from the group consisting of acids and polyvalent metallic salts, maintaining said lignin solution and said precipitant solution in said mixing zone in a state of turbulent flow having a Reynolds number of at least 75,000 whereby said solutions are rapidly intermixed, the lignin precipitated and the precipitated lignin particles formed thereby are subjected to said turbulent flow conditions, and thereafter separating the precipitated lignin from the residual liquid.

9. The method of claim 8 wherein the temperature of said aqueous solution of alkali lignin is between 35 and 120° F., the aqueous suspension of lignin particles formed by the precipitation of the lignin in said mixing zone is heated to a temperature of at least 180° F. and the lignin is thereafter separated from the residual liquid.

10. The method of claim 8 wherein a coagulant is introduced into the suspension of lignin particles formed by the precipitation of the lignin in said mixing zone and the lignin is thereafter separated from the residual liquid by filtration.

11. The method of claim 10 wherein said coagulant is a latex and is added in an amount equal to 1 to 10% by weight of the lignin.

References Cited by the Examiner
UNITED STATES PATENTS

| | | | |
|---|---|---|---|
| 1,666,969 | 4/1928 | Griessbach et al. | 260—124 XR |
| 2,228,976 | 1/1941 | Reboulet | 260—124 |
| 2,443,576 | 6/1948 | Farber | 260—124 |
| 2,676,931 | 4/1954 | Pollak | 260—17.5 |
| 2,838,483 | 6/1958 | Jantzen | 260—124 |
| 2,844,548 | 7/1958 | Haxo | 260—17.5 |
| 2,934,531 | 4/1960 | Gordon et al. | 260—124 |
| 2,997,466 | 8/1961 | Ball et al. | 260—124 |
| 3,048,576 | 8/1962 | Ball et al. | 260—124 |

CHARLES B. PARKER, *Primary Examiner.*

ALPHONSO D. SULLIVAN, DANIEL D. HORWITZ,
*Examiners.*